(12) United States Patent
Wang et al.

(10) Patent No.: US 11,061,266 B2
(45) Date of Patent: Jul. 13, 2021

(54) TOUCH ELECTRODE STRUCTURE AND TOUCH DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Qingpu Wang, Beijing (CN); Lei Zhang, Beijing (CN); Tsung Chieh Kuo, Beijing (CN); Wenjin Fan, Beijing (CN); Wei Zhang, Beijing (CN); Zhenzhong Fang, Beijing (CN); Xiaoyue He, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 333 days.

(21) Appl. No.: 15/751,001

(22) PCT Filed: Jun. 29, 2017

(86) PCT No.: PCT/CN2017/090868
§ 371 (c)(1),
(2) Date: Feb. 7, 2018

(87) PCT Pub. No.: WO2018/040712
PCT Pub. Date: Mar. 8, 2018

(65) Prior Publication Data
US 2020/0089384 A1 Mar. 19, 2020

(30) Foreign Application Priority Data
Aug. 31, 2016 (CN) .......................... 201610798598.2

(51) Int. Cl.
*G06F 3/041* (2006.01)
*G02F 1/1333* (2006.01)
(Continued)

(52) U.S. Cl.
CPC ...... *G02F 1/13338* (2013.01); *G02F 1/13439* (2013.01); *G06F 3/0412* (2013.01);
(Continued)

(58) Field of Classification Search
CPC ............. G02F 1/13338; G02F 1/13439; G06F 3/0443; G06F 3/0446; G06F 3/0448;
(Continued)

(56) References Cited

U.S. PATENT DOCUMENTS

2007/0092662 A1* 4/2007 Matsuno ................. G02B 1/105
428/1.3
2010/0156840 A1* 6/2010 Frey ......................... G06F 3/044
345/174

(Continued)

FOREIGN PATENT DOCUMENTS

CN 202372727 U 8/2012
CN 103677410 A 3/2014
(Continued)

OTHER PUBLICATIONS

The First Chinese Office Action dated Jul. 23, 2018; Appln. No. 201610798598.2.
(Continued)

*Primary Examiner* — Jose R Soto Lopez

(57) ABSTRACT

A touch electrode structure and a touch display device are provided. The touch electrode structure includes a base substrate, and a plurality of touch driving electrodes and a plurality of touch sensing electrodes which are disposed on the base substrate. The touch driving electrodes and the touch sensing electrodes are disposed in the same layer of
(Continued)

the base substrate and are insulated from each other, at least one of each of the touch driving electrodes and each of the touch sensing electrodes includes a metal mesh structure, the metal mesh structure includes a plurality of irregular polygonal metal frames.

15 Claims, 3 Drawing Sheets

(51) Int. Cl.
  *G02F 1/1343* (2006.01)
  *G06F 3/044* (2006.01)
(52) U.S. Cl.
  CPC .......... *G06F 3/0443* (2019.05); *G06F 3/0446* (2019.05); *G06F 3/0448* (2019.05); *G06F 3/04164* (2019.05)
(58) Field of Classification Search
  CPC ............... G06F 3/04164; G06F 3/0412; G06F 2203/04112; G06F 3/044
  See application file for complete search history.

(56) References Cited

U.S. PATENT DOCUMENTS

| | | | | |
|---|---|---|---|---|
| 2012/0227259 | A1* | 9/2012 | Badaye | G06F 3/04164 29/846 |
| 2013/0002994 | A1* | 1/2013 | Wang | G02F 1/133528 349/96 |
| 2013/0021296 | A1* | 1/2013 | Min | G06F 3/0443 345/174 |
| 2013/0082719 | A1* | 4/2013 | Prendergast | G06F 3/04164 324/658 |
| 2013/0127776 | A1* | 5/2013 | Guard | G02F 1/13338 345/174 |
| 2013/0162560 | A1 | 6/2013 | Sun et al. | |
| 2014/0022467 | A1* | 1/2014 | Chai | G06F 3/0445 349/12 |
| 2014/0098307 | A1* | 4/2014 | Iwami | H05K 1/0213 349/12 |
| 2014/0118642 | A1* | 5/2014 | Wang | G02F 1/134336 349/12 |
| 2014/0192277 | A1* | 7/2014 | Yilmaz | G02B 1/04 349/12 |
| 2014/0313435 | A1* | 10/2014 | Cho | H01J 9/20 349/12 |
| 2015/0022738 | A1* | 1/2015 | Chou | G06F 3/0445 349/12 |
| 2015/0070309 | A1* | 3/2015 | Kang | G06F 3/0445 345/174 |
| 2015/0097810 | A1 | 4/2015 | Aoki et al. | |
| 2015/0109245 | A1* | 4/2015 | Chou | G06F 3/0446 345/174 |
| 2015/0115254 | A1* | 4/2015 | Choi | G06F 3/0445 257/40 |
| 2015/0160758 | A1* | 6/2015 | Chen | G06F 3/0445 345/174 |
| 2015/0177876 | A1* | 6/2015 | Ishii | G02F 1/13338 345/174 |
| 2015/0205424 | A1* | 7/2015 | Park | G06F 3/04164 345/174 |
| 2015/0212619 | A1* | 7/2015 | Yoo | G06F 3/041 345/174 |
| 2015/0253810 | A1* | 9/2015 | Shin | G06F 3/0445 345/174 |
| 2015/0324047 | A1* | 11/2015 | Kim | G06F 3/0412 345/173 |
| 2015/0363020 | A1* | 12/2015 | Chen | G06F 3/0412 345/174 |
| 2016/0041643 | A1* | 2/2016 | Gu | G06F 3/0445 345/174 |
| 2016/0109977 | A1 | 4/2016 | Hashimoto et al. | |
| 2016/0195958 | A1* | 7/2016 | Odagiri | G06F 3/041 345/174 |
| 2016/0209958 | A1* | 7/2016 | Choi | G06F 3/0418 |
| 2016/0209967 | A1* | 7/2016 | Ku | G06F 3/0446 |
| 2016/0306464 | A1* | 10/2016 | Lee | G06F 3/0443 |
| 2016/0378224 | A1* | 12/2016 | Kwon | G06F 3/044 345/174 |
| 2017/0010399 | A1* | 1/2017 | Yasui | G02B 5/305 |
| 2017/0075491 | A1* | 3/2017 | Ye | G06F 3/0443 |
| 2017/0097700 | A1* | 4/2017 | Kim | G06F 3/0445 |
| 2017/0168608 | A1* | 6/2017 | Kim | G06F 3/0446 |
| 2017/0185105 | A1* | 6/2017 | Fan | G06F 1/1652 |
| 2017/0192574 | A1* | 7/2017 | Koike | G06F 3/0446 |
| 2017/0220161 | A1* | 8/2017 | Lee | G06F 3/0443 |
| 2017/0228090 | A1* | 8/2017 | Nakamura | G06F 3/0445 |
| 2017/0235176 | A1* | 8/2017 | Oishi | B60K 35/00 349/12 |
| 2017/0248827 | A1* | 8/2017 | Zhang | H01L 27/1248 |
| 2017/0277324 | A1* | 9/2017 | Dan | G06F 3/0446 |
| 2017/0300160 | A1* | 10/2017 | Tsai | G06F 3/0445 |
| 2017/0308202 | A1 | 10/2017 | Fang et al. | |
| 2017/0371448 | A1* | 12/2017 | Toyota | G06F 3/0446 |
| 2018/0059846 | A1* | 3/2018 | Tada | G06F 3/041 |
| 2018/0062112 | A1* | 3/2018 | Heo | H01L 51/424 |
| 2018/0101258 | A1* | 4/2018 | Cho | G06F 3/041 |
| 2018/0196561 | A1* | 7/2018 | Kim | G06F 3/0445 |
| 2018/0232080 | A1* | 8/2018 | Iwami | G02F 1/13338 |
| 2018/0267351 | A1* | 9/2018 | Yamamoto | G02F 1/13338 |
| 2018/0271180 | A1* | 9/2018 | Kim | G06Q 50/04 |
| 2018/0321763 | A1* | 11/2018 | Liu | G06F 3/047 |

FOREIGN PATENT DOCUMENTS

| | | |
|---|---|---|
| CN | 203746036 U | 7/2014 |
| CN | 104345932 A | 2/2015 |
| CN | 105183264 A | 12/2015 |
| CN | 105204683 A | 12/2015 |
| CN | 204965375 U | 1/2016 |
| CN | 105807969 A | 7/2016 |
| CN | 106249979 A | 12/2016 |

OTHER PUBLICATIONS

International Search Report and Written Opinion dated Sep. 29, 2017; PCT/CN2017/090868.

* cited by examiner

TOUCH ELECTRODE STRUCTURE AND TOUCH DISPLAY DEVICE

TECHNICAL FIELD

Embodiments of the present disclosure relate to a touch electrode structure and a touch display device.

BACKGROUND

Currently, with continuous development of touch technology, the touch technology has been widely applied in electronic products such as a mobile phone, a tablet computer, a laptop and so on. Generally, the touch technology includes optical, resistive, capacitive, electromagnetic touch technologies and other different technical directions; among the various touch technologies, capacitive touch technology has become a mainstream of the touch technology due to its low cost and excellent user experience.

The capacitive touch technology can be divided into two modes including a self-capacitance mode and a mutual-capacitance mode. Because the mutual-capacitance mode touch technology can achieve multi-touch, the mutual-capacitance mode touch technology has become the mainstream of the market and a trend of future development. Generally, the mutual-capacitance touch technology realizes the multi-touch through a plurality of touch driving electrodes and a plurality of touch sensing electrodes which are intersected with each other and respectively arranged along a transverse direction and a longitudinal direction, the plurality of touch driving electrodes and the plurality of touch sensing electrodes are disposed in different layers and are insulated from each other.

SUMMARY

Embodiments of the present disclosure provide a touch electrode structure and a touch display device. The touch electrode structure includes a base substrate, and a plurality of touch driving electrodes and a plurality of touch sensing electrodes which are disposed on the base substrate. The touch driving electrodes and the touch sensing electrodes are disposed in the same layer of the base substrate and are insulated from each other, each of the touch driving electrodes and/or each of the touch sensing electrodes includes a metal mesh structure, the metal mesh structure includes a plurality of irregular polygonal metal frames. Thus, on the one hand, the touch driving electrodes and the touch sensing electrodes including the metal mesh structure in the touch electrode structure do not influence a display effect of the touch display device provided by the present embodiment in a case of using metal; on the other hand, maximum channel impedance of the touch driving electrodes and the touch sensing electrodes can be reduced, so that a single layer touch technology can be applied to a large size electronic product and a moire pattern phenomenon can be eliminated.

At least one embodiment of the present disclosure provides a touch electrode structure, which includes: a base substrate; a plurality of touch driving electrodes, disposed on the base substrate; and a plurality of touch sensing electrodes, disposed on the base substrate in a same layer as the touch driving electrodes, each of the touch driving electrodes and/or each of the touch sensing electrodes includes a metal mesh structure, the metal mesh structure includes a plurality of irregular polygonal metal frames.

For example, in the touch electrode structure provided by an embodiment of the present disclosure, each of the touch driving electrodes and/or each of the touch sensing electrodes further includes protection layers disposed on both sides of the metal mesh structure, the protection layers and the metal mesh structure are disposed in a same shape.

For example, the touch electrode structure provided by an embodiment of the present disclosure further includes: each of the touch driving electrodes and/or each of the touch sensing electrodes further includes an anti-reflective layer disposed on a side of the metal mesh structure away from the base substrate, the anti-reflective layer and the metal mash structure are disposed in a same shape.

For example, the touch electrode structure provided by an embodiment of the present disclosure further includes: a plurality of first metal leads, electrically connected with the plurality of touch driving electrodes respectively; and a plurality of second metal leads, electrically connected with the plurality of touch sensing electrodes respectively.

For example, in the touch electrode structure provided by an embodiment of the present disclosure, the plurality of touch driving electrodes are arranged in an array on the base substrate, the plurality of touch sensing electrodes are arranged in an array on the base substrate, the touch electrode structure further including: a flexible circuit board, wherein the plurality of first metal leads extend to the flexible circuit board, the plurality of first metal leads electrically connected to the touch driving electrodes in a same row are electrically connected with each other on the flexible circuit board; the plurality of second metal leads extend to the flexible circuit board, the plurality of second metal leads electrically connected to the touch sensing electrodes in a same column are electrically connected with each other on the flexible circuit board.

For example, in the touch electrode structure provided by an embodiment of the present disclosure, a material of the metal mesh structure includes a metal or an alloy of a metal selected from a group consisting of aluminum, molybdenum, silver and copper.

For example, in the touch electrode structure provided by an embodiment of the present disclosure, each of the irregular polygonal metal frames includes a plurality of metal wires connected end-to-end, the metal wires have a width range of 1 μm-4 μm.

For example, in the touch electrode structure provided by an embodiment of the present disclosure, a material of the protection layer includes molybdenum or molybdenum alloy.

For example, in the touch electrode structure provided by an embodiment of the present disclosure, a material of the anti-reflective layer includes molybdenum oxide.

For example, in the touch electrode structure provided by an embodiment of the present disclosure, the plurality of first metal leads and/or the plurality of second metal leads have a width range of 1 μm-4 μm.

At least one embodiment of the present disclosure provides a touch display device, which includes: a display panel, the display panel includes a light exit surface; and a touch electrode structure, the touch electrode structure is any touch electrode structure as mentioned above, the touch electrode structure is disposed on a side of the display panel where the light exit surface is located.

For example, the touch display device provided by an embodiment of the present disclosure further includes a polarizer disposed on the display panel, the touch electrode structure is disposed between the display panel and the polarizer.

For example, the touch display device provided by an embodiment of the present disclosure further includes an optically transparent layer disposed on the polarizer and a protection module disposed on the optically transparent layer, the protection module is adhered to the polarizer through the optically transparent layer.

For example, the touch display device provided by an embodiment of the present disclosure further includes a polarizer disposed on the display panel and an optically transparent layer disposed on the polarizer, the touch electrode structure is disposed on the optically transparent layer.

For example, the touch display device provided by an embodiment of the present disclosure further includes a protection module disposed on the touch electrode structure.

For example, in the touch display device provided by an embodiment of the present disclosure, the optically transparent layer includes optical clear resin or optical clear adhesive.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

DETAILED DESCRIPTION

Figure 1:
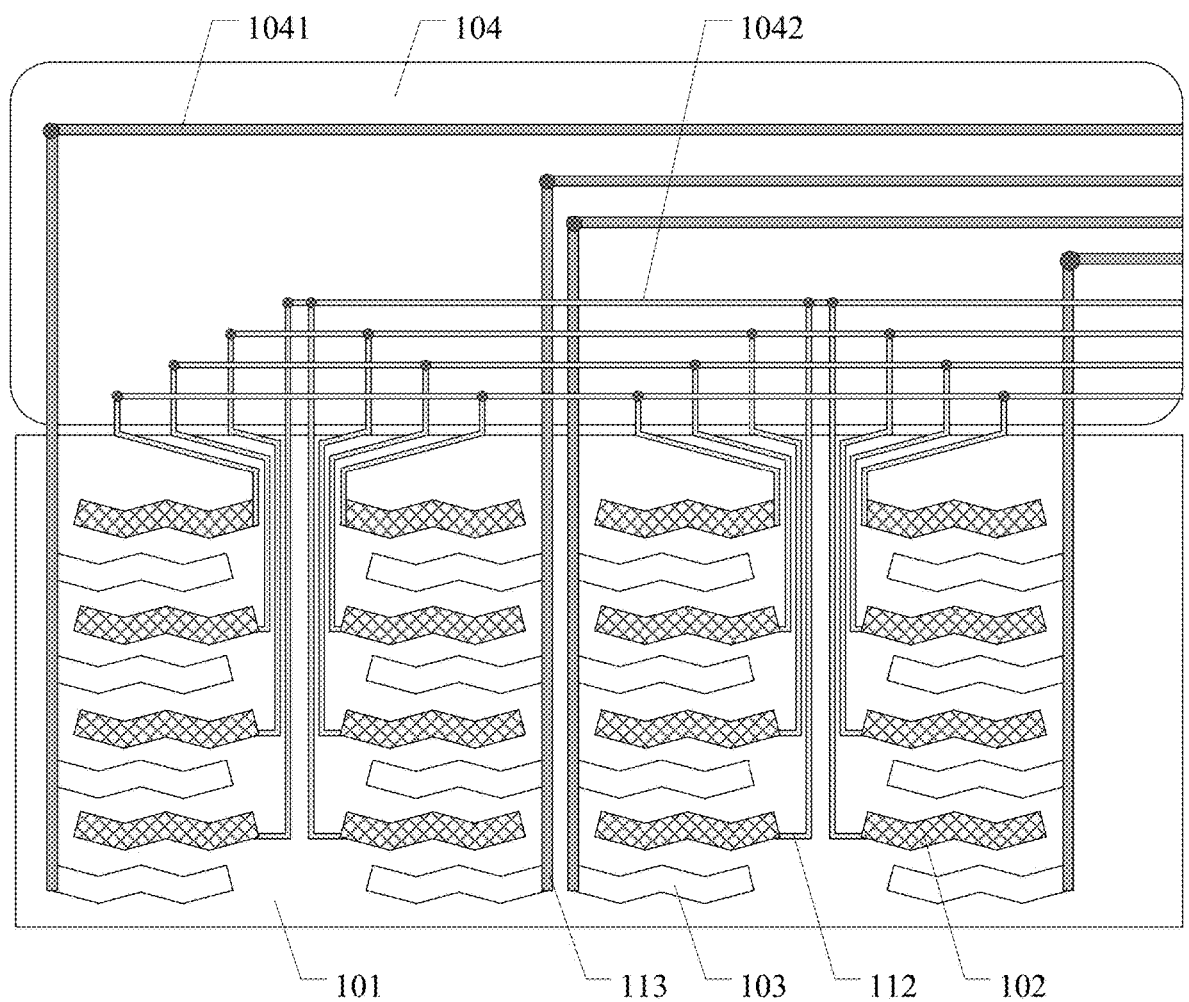
FIG. 1 is a planar view of a touch electrode structure provided by an embodiment of the present disclosure.

In order to make objects, technical details and advantages of the embodiments of the present disclosure apparently, the technical solutions of the embodiments will be described in a clearly and fully understandable way in connection with the drawings related to the embodiments of the present disclosure. It is obvious that the described embodiments are just a part but not all of the embodiments of the present disclosure. Based on the described embodiments herein, a person having ordinary skill in the art may obtain other embodiment(s), without any inventive work, which should be within the scope of the disclosure.

Unless otherwise defined, the technical terms or scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "includes," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

Currently, in touch technical field, the process of a single layer touch technology is relatively simple, and multi-touch can be realized by forming a single layer of indium tin oxide electrode pattern (ITO Pattern) on a display panel. Compared with in-cell touch technology, the single layer touch technology has a simpler process and a better yield; compared with one glass solution (OGS) touch technology, the single layer touch technology has a simpler process and lighter weight, and has no problem that an edge line covers light. Therefore, the single layer touch technology has very high competitiveness in a portable and a mobile electronic market. And, the inventor(s) of the application considers that: with the development of a touch laptop market, the demand for a narrow frame and frameless product is increasing, and the single touch technology utilizes edge wiring to realize a narrow frame and even frameless design. However, the single touch technology uses indium tin oxide (ITO) as an electrode material, because the indium tin oxide has a higher sheet resistance (~40 ohm/$\diamond$), the single layer touch technology is generally limited to a 7 inch product, and is difficult to be applied to a large size product (for example, a laptop).

Embodiments of the present disclosure provide a touch electrode structure and a touch display device. The touch electrode structure includes a base substrate, and a plurality of touch driving electrodes and a plurality of touch sensing electrodes which are disposed on the base substrate. The touch driving electrodes and the touch sensing electrodes are disposed in the same layer of the base substrate and are insulated from each other, each of the touch driving electrodes and/or each of the touch sensing electrodes includes a metal mesh structure, the metal mesh structure includes a plurality of irregular polygonal metal frames. Thus, on the one hand, the touch driving electrodes and the touch sensing electrodes including the metal mesh structure in the touch electrode structure do not influence a display effect of the touch display device provided by the present embodiment in a case of using metal; on the other hand, maximum channel impedance of the touch driving electrodes and the touch sensing electrodes can be reduced, so that a single layer touch technology can be applied to a large size electronic product and a moire pattern phenomenon may be eliminated.

Hereafter, the touch electrode structure and the touch display device provided by the embodiments of the present disclosure will be described below with reference to the drawings.

First Embodiment

The present embodiment provides a touch electrode structure, as illustrated in FIG. 1, the touch electrode structure includes a base substrate 101, and a plurality of touch driving electrodes 102 and a plurality of touch sensing electrodes 103 which are disposed on the base substrate 101. The touch driving electrodes 102 and the touch sensing electrodes 103 are disposed in the same layer and are insulated from each other, each of the touch driving electrodes and/or each of the touch sensing electrodes includes a metal mesh structure, the metal mesh structure includes a plurality of irregular polygonal metal frames.

Figure 2:
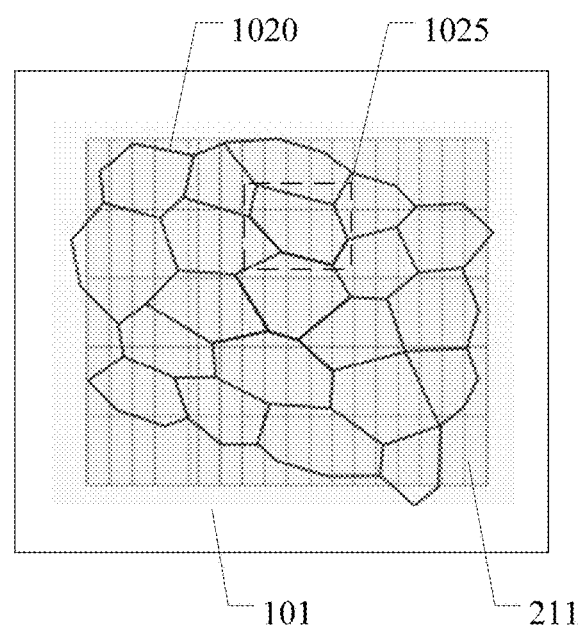
FIG. 2 is a planar view of a touch driving electrode provided by an embodiment of the present disclosure.

Hereafter, a touch driving electrode is described as an example. As illustrated in FIG. 2, the touch driving electrode 102 includes a metal mesh structure 1020, the metal mesh structure 1020 includes a plurality of irregular polygonal metal frames 1025. It should be noted that, the touch sensing electrode may also include the metal mesh structure, and its specific features may refer to a relevant description of the touch driving electrode, in addition, the plurality of irregular polygonal metal frames as mentioned above refers to a length and an angle of metal wires constituting the irregular polygonal metal frames are irregular.

In the touch electrode structure provided by the present embodiment, the plurality of irregular polygonal metal frames constitute a metal mesh structure; because metal has a smaller resistivity, the metal wires in the irregular polygonal metal frames can be made thinner, and the metal wires may meet a requirement of an electrical property of the touch electrode at the same time. A size of transmission parts of the metal mesh structure (that is, parts surrounded by the metal wires in the irregular polygonal metal frames) is much larger than a size of opaque parts (that is, the metal wires in the irregular polygonal metal frames), so as to ensure that light transmittance of the touch driving electrodes and/or touch sensing electrodes is large enough in a case of using metal, a normal display effect of the touch display device provided by the present embodiment may not be influenced, and maximum channel impedance of the touch driving electrodes and the touch sensing electrodes can be reduced, thereby the touch electrode structure can be applied to a large size electronic product. In addition, as illustrated in FIG. 2, because the metal mesh structure 1020 includes the plurality of irregular polygonal metal frames 1025, the metal mesh structure 1020 has no periodic structure, a space beat effect between a periodic structure of pixel units 211 in the touch display device including the touch electrode structure provided by the present embodiment and the touch electrode structure can be avoided, accordingly, a moire pattern on the touch display device can be avoided.

For example, as illustrated in Table 1, in a case that a size of a touch display panel is 3.97 inch, the maximum channel impedance of an indium tin oxide single layer touch electrode structure is only 17.3 Kohm, in a case that the size of the touch display panel reaches 14.0 inch, the maximum channel impedance of the indium tin oxide single layer touch electrode structure reaches 61.0 Kohm, which results that a driving circuit (driving IC) cannot be driven to realize touch control. In a case that the size of the touch display panel reaches 14.0 inch, the touch electrode structure provided by the present embodiment is only 11.3 Kohm, the driving circuit may still be easily driven, thereby, the touch electrode structure provided by an embodiment of the present disclosure may be applied to a larger size touch display device.

TABLE 1 a comparison of impedance between the metal mesh structure single layer touch solution and the indium tin oxide single layer touch solution.

| | Item | | |
|---|---|---|---|
| | Indium tin oxide single layer touch electrode structure | | Touch electrode structure provided by the present embodiment |
| Size | 3.97 | 14.0 | 14.0 |
| The maximum channel impedance/Kohm | 17.3 | 61.0 | 11.3 |

For example, in the touch electrode structure provided by an example of the present embodiment, a material that forms the metal mesh structure includes a metal or an alloy of a metal selected from a group consisting of aluminum, molybdenum, silver and copper. In a case that the metal mesh structure is made of a metal or an alloy of a metal selected from a group consisting of aluminum, molybdenum, silver and copper, because the metal or the alloy of the metal selected from a group consisting of aluminum, molybdenum, silver and copper have a lager conductivity, the maximum channel impedance of the touch electrode structure provided by the present embodiment is relatively small, thereby the touch electrode structure can be applied to a large size touch display device, such as a laptop, a television and so on. Of course, the embodiments of the present disclosure include but are not limited thereto, the material that forms the metal mesh structure may be other metal materials.

For example, in the touch electrode structure provided by an example of the present embodiment, as illustrated in FIG. 1, the touch electrode structure includes a plurality of first metal leads 112 and a plurality of second metal leads 113. The plurality of first metal leads 112 are electrically connected with the plurality of touch driving electrodes 102 respectively, the plurality of first metal leads 112 are electrically connected with the plurality of touch sensing electrodes 103 respectively, thereby, the plurality of touch driving electrodes 102 and the plurality of touch sensing electrodes 103 disposed in the same layer are respectively let out of a touch area and are electrically connected to such as a touch control chip, so as to apply or read electrical signals of the plurality of touch driving electrodes 102 and the plurality of touch sensing electrodes 103.

For example, in the touch electrode structure provided by an example of the present embodiment, the plurality first metal leads and/or the plurality of second metal leads may have a width range of 1 µm-4 µm. Because of the first metal leads and/or the second metal leads are made of metal with high conductivity, the width range of the first metal leads and/or the second metal leads may be only 1 µm-4 µm, in this case, human eyes usually cannot detect the presence of the first metal leads and/or the second metal leads, so that the display effect of the touch display device adopting the touch electrode structure provided by the present embodiment can be improved. Of course, embodiments of the present disclosure include but are not limited thereto, the first metal leads and/or the second metal leads may have other width ranges.

For example, in the touch electrode structure provided by an example of the present embodiment, as illustrated in FIG. 2, each of the irregular polygonal metal frames 1025 includes a plurality of metal wires 1027 connected end-to-end, the metal wires 1027 have a width range of 1 µm-4 µm. Similarly, because of the irregular polygonal metal frames are made of metal with high conductivity, the width range of the irregular polygonal metal frames may be only 1 µm-4 µm, in this case, human eyes usually cannot detect the presence of the irregular polygonal metal frames, so that the display effect of the touch display device adopting the touch electrode structure provided by the present embodiment can be improved. Of course, embodiments of the present disclosure include but are not limited thereto, the irregular polygonal metal frames may have other width ranges.

For example, in the touch electrode structure provided by an example of the present embodiment, as illustrated in FIG. 1, the plurality of touch driving electrodes 102 are arranged in an array on the base substrate 101; the plurality of the touch sensing electrodes 103 are arranged in an array on the base substrate 101. The plurality of the touch driving electrodes 102 and the plurality of touch sensing electrodes 103 are intersected with each other, each of the touch driving electrodes 102 respectively forms a coupling capacitance with a touch sensing electrode 103 adjacent to the touch driving electrode 102 so as to sense a touch operation.

However, in the embodiments of the present disclosure, a position relationship between the touch sensing electrodes and the touch driving electrodes which are disposed on the same layer is not limited to the situation illustrated in FIG. 1, as long as the single layer touch control can be realized.

As illustrated in FIG. 1, the touch electrode structure further includes a flexible circuit board 104. The plurality of first metal leads 112 extend to the flexible circuit board 104, and the plurality of first metal leads 112 electrically connected to the touch driving electrodes 102 in a same column are electrically connected with each other on the flexible circuit board 104, for example, the flexible circuit board 104 may be a multiple layer structure, the plurality of first metal leads 112 electrically connected to the touch driving electrodes 102 in the same row can be electrically connected with each other on the flexible circuit board 104 by using a first conductive lead 1041 through a via hole or a bridge. Similarly, the plurality of second metal leads 113 extend to the flexible circuit board 104, the plurality of second metal leads 113 electrically connected to the touch sensing electrodes 103 in a same column are electrically connected with each other on the flexible circuit board 104, for example, the flexible circuit board 104 may be a multiple layer structure, the plurality of second metal leads 113 electrically connected to the touch sensing electrodes 103 in the same column can be electrically connected with each other on the flexible circuit board 104 by using a second conductive lead 1042 through a via hole or a bridge. Thus, the touch electrode structure provided by the present embodiment may realize mutual-capacitance touch technology on the single layer, thereby realizing multi-touch. It should be noted that, in order to clearly illustrate a connection relationship as mentioned above, FIG. 1 only illustrates four rows and four columns touch driving electrodes and touch sensing electrodes, obviously, the touch display structure provided by the present embodiment may further includes more touch driving electrodes and touch sensing electrodes, and the present disclosure is not limited thereto. It should be noted that, in the touch electrode structure provided by the present embodiment, the plurality of first metal leads and the plurality of second metal leads do not need to be wired on an edge of the touch electrode structure, so that the touch electrode structure can be applied to a narrow frame or a frameless electronic product.

Second Embodiment

Figure 3:
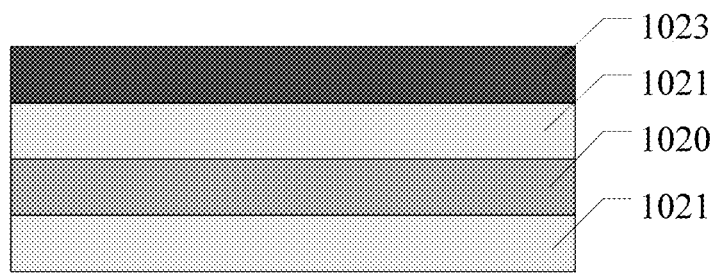
FIG. 3 is a sectional view of a touch driving electrode provided by an embodiment of the present disclosure.

On the basis of the first embodiment, the present embodiment provides a touch electrode structure, in the touch electrode structure provided by the present embodiment, each of the touch driving electrodes and/or each of the touch sensing electrodes further includes protection layers disposed on both sides of the metal mesh structure, and the protection layers and the metal mesh structure are disposed in a same shape. Hereafter, a touch driving electrode is described as an example, as illustrated in FIG. 3, the touch driving electrode 102 includes a metal mesh structure 1020 and the protection layers 1021 disposed on both sides of the metal mesh structure 1020. The protection layers 1021 and the metal mesh structure 1020 are disposed in the same shape, that is, the protection layer 1021 have a mesh structure with the same shape as the metal mesh structure 1020. For example, in a case of manufacturing the protection layer, a metal layer and the protection layer may be patterned by using the same mask to obtain the metal mesh structure 1020 and the protection layers which are disposed with the same shape, wherein the protection layers are disposed on both sides of the metal mesh structure 1020.

In the touch electrode structure provided by the present embodiment, on the one hand, the protection layer can prevent the metal mesh structure from being damaged by a spike or an impurity bulge on the base substrate, so as to prevent defects such as disconnection in the metal mesh structure; on the other hand, the protection layer can isolate the metal mesh structure from the oxygen, thereby playing a role that prevent the metal mesh from being oxidized. It should be noted that, in a case that the metal wires constituting the metal mesh structure have a smaller width, the metal mesh structure is easily influenced and broken by the spike or the impurity bulge on the base substrate, therefore, the protection layer disposed on both side of the metal mesh structure can ensure the yield of the touch electrode structure provided by the present embodiment.

For example, in the touch electrode structure provided by an example of the present embodiment, a material of the protection layer includes molybdenum or molybdenum alloy and so on.

For example, in the touch electrode structure provided by an example of the present embodiment, each of the touch driving electrodes and/or each of the touch sensing electrodes further includes an anti-reflective layer disposed on a side of the metal mesh structure away from the base substrate, the anti-reflective layer and the metal mash structure are disposed in a same shape. Hereafter, a touch driving electrode is described as an example, as illustrated in FIG. 3, the touch driving electrode further includes an anti-reflective layer 1023 disposed on the metal mesh structure 1020 (that is, the anti-reflective layer is disposed on a side of the metal mesh structure away from the base substrate), the anti-reflective layer 1023 and the metal mesh structure 1020 are disposed with the same shape, that is, the anti-reflective layer 1023 has a mesh structure of the same shape as the metal mesh structure 1020. Because metal a has higher light reflectance, the anti-reflective layer formed on the metal mesh structure may reduce or even eliminate reflection of the metal mesh structure on external ambient light, so as to prevent the reflected external ambient light from adversely affecting the display effect on the touch display device adopting the touch electrode structure provided by the present embodiment.

For example, in the touch electrode structure provided by an example of the present embodiment, a material of the anti-reflective layer may include molybdenum oxide. At this point, the anti-reflective layer can be formed by introducing oxygen into a molybdenum sputtering chamber. Of course, the present embodiment includes but is not limited thereto, the material of the anti-reflective layer may adopt other materials.

For example, in the touch electrode structure provided by an example of the present disclosure, each of the touch driving electrodes and/or each of the touch sensing electrodes includes the protection layers and the anti-reflective layer at the same time. Hereafter, a touch driving electrode is described as an example for description, as illustrated in FIG. 3, the touch driving electrode includes the protection layers 1021 and the anti-reflective layer 1023, the anti-reflective layer 1023 is disposed on the protection layer 1021.

Third Embodiment

Figure 4:
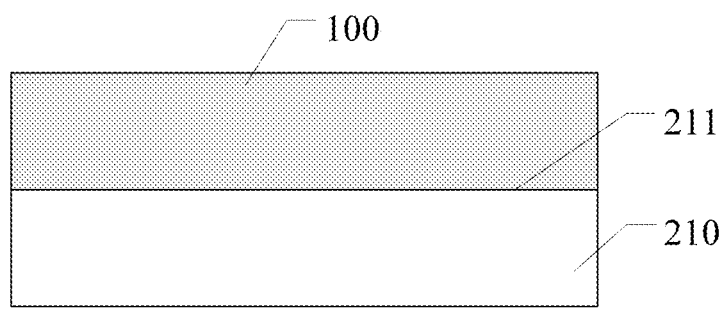
FIG. 4 is a sectional view of a touch display device provided by an embodiment of the present disclosure.

The present embodiment provides a touch display device, as illustrated in FIG. 4, the touch display device includes a display panel 210 and a touch electrode structure 100, the display panel 210 includes a light exit surface 211, the touch electrode structure 100 is any touch electrode structure as mentioned above, and the touch electrode structure 100 is disposed on a side of the display panel 210 where the light exit surface 211 is located. The touch display panel includes any touch electrode structure as mentioned above, therefore, the touch display device may be a large size electronic product, such as a laptop, a television and so on. In addition, because the metal mesh structure includes the plurality of irregular polygonal metal frames, the metal mesh structure has no periodic structure, a space beat effect formed between a periodic structure of pixel units in the touch display panel and the touch electrode structure can be avoided, and such that a moire pattern can be avoided. The specific effect may refer to relevant descriptions in the first embodiment and the second embodiment. It should be noted that, the display panel as mentioned above includes a liquid crystal display panel or an organic light emitting diode (OLED) display panel.

Figure 5:
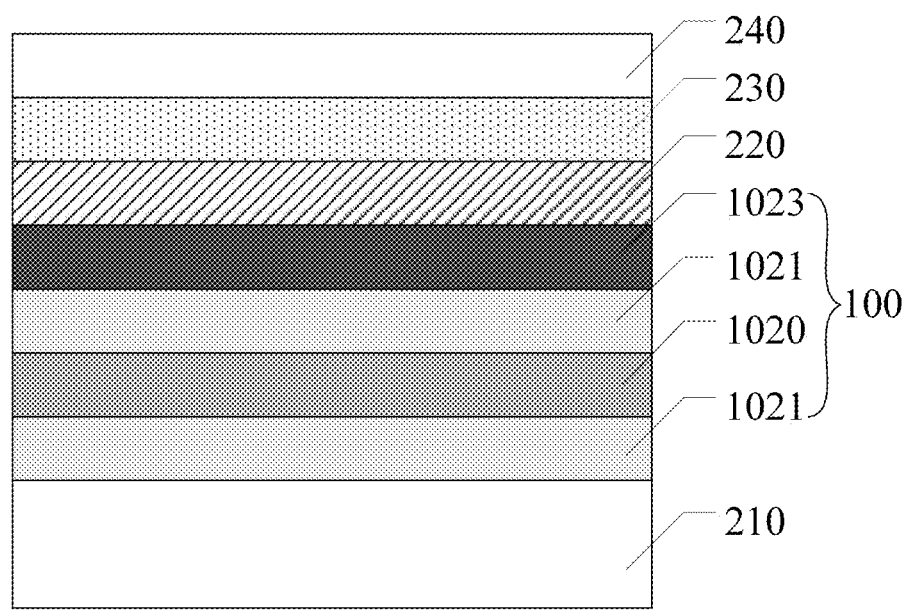
FIG. 5 is a sectional view of another touch display device provided by an embodiment of the present disclosure.

For example, in the touch display device provided by an example of the present disclosure, as illustrated in FIG. 5, the anti-reflective layer 1023 (taking the anti-reflective layer of the touch driving electrodes as an example) of the touch electrode structure 100 is disposed on a side of the touch electrode structure 100 away from the light exit surface 211, so as to reduce or even eliminate the reflection of the metal mesh structure 1020 in the touch electrode structure 100 on the external ambient light to prevent the reflected external ambient light from adversely affecting the display effect of the touch display device. It should be noted that, because of the touch driving electrodes and the touch sensing electrodes in the touch electrode structure are disposed in the same layer, the relevant description on the touch driving electrodes as mentioned above is also applied to the touch sensing electrodes.

For example, in the touch display device provided by an example of the present embodiment, as illustrated in FIG. 5, the touch display device further includes a polarizer 220 disposed on the display panel 210. The touch electrode structure 100 is disposed between the display panel 210 and the polarizer 220. At this point, the touch display device is an On-Cell touch display device. For example, the display panel 210 may be a liquid crystal cell, including an array substrate and an opposing substrate opposite to the array substrate, and a liquid crystal layer filled between the array substrate and the opposing substrate.

For example, in the touch display device provided by an example of the present embodiment, as illustrated in FIG. 5, the touch display device further includes an optically transparent layer 230 disposed on the polarizer 220 and a protection module 240 disposed on the optically transparent layer 230, the protection module 240 is adhered to the polarizer 220 through the optically transparent layer 230. For example, the protection module 240 may be a protection glass layer or a plastic layer and so on.

Figure 6:
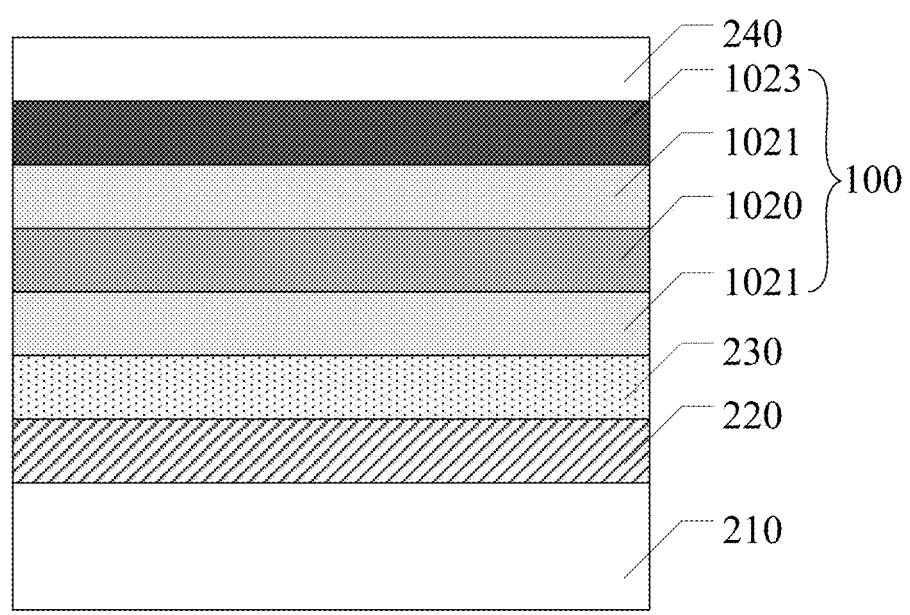
FIG. 6 is a sectional view of another touch display device provided by an embodiment of the present disclosure.

For example, in the touch display device provided by an example of the present embodiment, as illustrated in FIG. 6, the touch display device may further include a polarizer 220 disposed on the display panel 210 and an optically transparent layer 230 disposed on the polarizer 220. The touch electrode structure 100 is disposed on the optically transparent layer 230, and adhered to the polarizer 220 through the optically transparent layer 230. At this point, the touch display device is an on-cell touch display device.

For example, in the touch display device provided by an example of the present embodiment, as illustrated in FIG. 6, the touch display device further includes a protection module 240 disposed on the touch electrode structure 100. For example, the protection module 240 may be a protection glass layer or a plastic layer and so on.

For example, the optically transparent layer may include optical clear resin or optical clear adhesive.

The following points should to be explained:

1) The drawings of at least one embodiment of the present disclosure only relate to the structure in the embodiment of the present disclosure, and other structures may be referenced to the usual design.

2) For clarity purposes, the thickness and size of a layer or microstructure are amplified in the drawings for at least one embodiment of the present disclosure. It should be understood that, in a case that a component such as a layer, a membrane, a region, or a substrate is referred to be located "on" or "down" another element, the component may be located "on" or "down" the another element "directly", or may have an intermediate element.

3) In the absence of conflict, the features of the same embodiment and the different embodiments ban be combined with each other.

The above are only specific implementations of the present disclosure. However the scope of the present disclosure is not limited thereto, the scope of the present disclosure should be based on the scope of the claims.

The present application claims priority of China Patent application No. 201610798598.2 filed on Aug. 31, 2016, the content of which is incorporated in its entirety as portion of the present application by reference herein.

What is claimed is:

1. A touch electrode structure, comprising:
a base substrate;
a plurality of touch driving electrodes, disposed on the base substrate; and
a plurality of touch sensing electrodes, disposed on the base substrate in a same layer as the touch sensing electrodes,
wherein at least one of each of the touch driving electrodes and each of the touch sensing electrodes comprises a metal mesh structure, and the metal mesh structure comprises a plurality of irregular polygonal metal frames,
each of the touch driving electrodes and/or each of the touch sensing electrodes further comprises protection layers disposed on both sides of the metal mesh structure, the protection layers and the metal mesh structure are disposed in a same shape, each of the protection layers has a mesh structure with the same shape as the metal mesh structure, a material of the protection layers comprises a conductive metal material,
the touch electrode structure further comprises a plurality of first metal leads, electrically connected with the plurality of touch driving electrodes respectively and a plurality of second metal leads, electrically connected with the plurality of touch sensing electrodes respectively,
the plurality of touch driving electrodes and the plurality of touch sensing electrodes are arranged in an array on the base substrate to form a plurality of touch electrode columns, in each of the plurality of touch electrodes columns, multiple touch driving electrodes and multiple touch sensing electrodes are alternately arranged, two adjacent ones of the plurality of touch electrodes columns form a touch electrode group,
in the touch electrode group, multiple first metal lines electrically connected with the multiple touch driving electrodes are located between the two adjacent ones of the plurality of touch electrodes columns, and two second metal lines electrically connected with the multiple touch sensing electrodes are located at two sides of the touch electrode group.

2. The touch electrode structure according to claim 1, wherein each of the touch driving electrodes and/or each of the touch sensing electrodes further comprises an anti-reflective layer disposed on a side of the metal mesh structure away from the base substrate, the anti-reflective layer and the metal mash structure are disposed in a same shape.

3. The touch electrode structure according to claim 1, wherein the touch electrode structure further comprising:
a flexible circuit board, wherein the plurality of first metal leads extend to the flexible circuit board, the plurality of first metal leads electrically connected to the touch driving electrodes in a same row are electrically connected with each other on the flexible circuit board; the plurality of second metal leads extend to the flexible circuit board, the plurality of second metal leads electrically connected to the touch sensing electrodes in a same column are electrically connected with each other on the flexible circuit board.

4. The touch electrode structure according to claim 1, wherein a material of the metal mesh structure comprises a metal or an alloy of a metal selected from a group consisting of aluminum, molybdenum, silver and copper.

5. The touch electrode structure according to claim 1, wherein each of the irregular polygonal metal frames comprises a plurality of metal wires connected end-to-end, and the metal wires have a width range of 1 μm-4 μm.

6. The touch electrode structure according to claim 1, wherein a material of the protection layer comprises molybdenum or molybdenum alloy.

7. The touch electrode structure according to claim 2, wherein a material of the anti-reflective layer comprises molybdenum oxide.

8. The touch electrode structure according to claim 1, wherein the plurality of first metal leads and/or the plurality of second metal leads have a width range of 1 μm-4 μm.

9. A touch display device, comprising:
a display panel, the display panel comprises a light exit surface; and
a touch electrode structure,
wherein the touch electrode structure is the touch electrode structure according to claim 1, the touch electrode structure is disposed on a side of the display panel where the light exit surface is located.

10. The touch display device according to claim 9, further comprising a polarizer disposed on the display panel, the touch electrode structure is disposed between the display panel and the polarizer.

11. The touch display device according to claim 10, further comprising an optically transparent layer disposed on the polarizer and a protection module disposed on the optically transparent layer, the protection module is adhered to the polarizer through the optically transparent layer.

12. The touch display device according to claim 9, further comprising a polarizer disposed on the display panel and an optically transparent layer disposed on the polarizer, the touch electrode structure is disposed on the optically transparent layer.

13. The touch display device according to claim 12, further comprising a protection module disposed on the touch electrode structure.

14. The touch display device according to claim 11, wherein the optically transparent layer comprises optical clear resin or optical clear adhesive.

15. The touch electrode structure according to claim 1, wherein, in the touch electrode group, the multiple first metal lines are electrically connected with the multiple touch driving electrodes, respectively, and one of the two second metal lines is electrically connected with all of the multiple touch sensing electrodes in one touch electrode column.

* * * * *